UNITED STATES PATENT OFFICE.

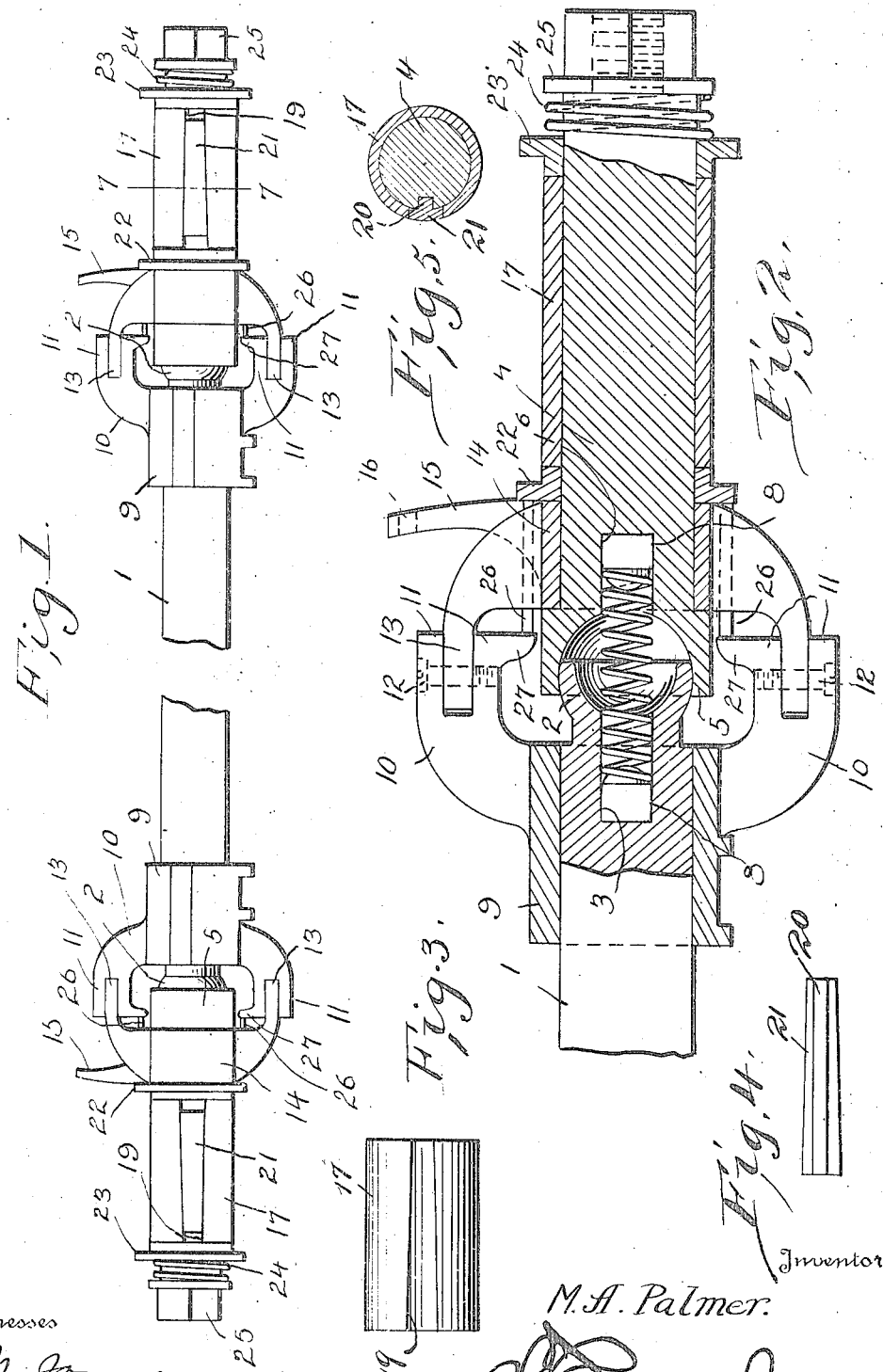

MAURICE A. PALMER, OF WHITE OAKS, NEW MEXICO.

ROTARY FRONT AXLE.

1,202,573.  Specification of Letters Patent.  Patented Oct. 24, 1916.

Application filed December 30, 1913. Serial No. 809,507.

*To all whom it may concern:*

Be it known that I, MAURICE A. PALMER, a citizen of the United States, residing at White Oaks, in the county of Lincoln and State of New Mexico, have invented certain new and useful Improvements in Rotary Front Axles; and I do hereby declare the following to be a full, clear, and exact description of the invention, such as will enable others skilled in the art to which it appertains to make and use the same.

This invention relates to rotary front axles for motor vehicles, and one of the principal objects of the invention is to provide knuckle joints for the wheel spindles of the front axle, said knuckle joints to be fully covered and protected from dust, and means being provided for permitting the wheels to turn free on the spindles in making short turns to prevent the slipping of the wheels or the tire portion on the ground or pavement.

The foregoing and other objects may be attained by means of the construction illustrated in the accompanying drawings, in which, Figure 1 is a view in front elevation of the front axle made in accordance with this invention, Fig. 2 is a longitudinal sectional view of one of the knuckle joints, Fig. 3 is a plan view of the spindle bushing, Fig. 4 is a similar view of a key for releasing the hub of the wheel, and Fig. 5 is a sectional view taken on the line 7—7 of Fig. 1.

Referring to the drawings the numeral 1 designates the front axle, and at the opposite ends of said axle are rounded joint members 2, which are hollowed out, and extending longitudinally of the axle is a rectangular recess 3. The spindle 4 is provided with a joint member 5 which incloses the member 2, said member 5 being also hollowed out and longitudinally of the spindle is a rectangular recess 6.

A spiral spring 7 is connected at its opposite ends to the rectangular blocks 8 and said blocks are fitted within the recesses 3 and 6 in the end of the axle and in the spindle. Fitted to the ends of the axle 1 are knuckle members, each comprising a sleeve or collar 9 and curved arms 10. The curved arms 10 are provided with spaced lugs 11, and pivoted between said lugs on the pins or screws 12 are the curved arms 13 of the knuckle member connected to the spindle. This knuckle member is provided with a sleeve 14 fixed to the spindle 4, and an arm 15 provided with an aperture 16 for connection to the rods leading to the steering gear. Mounted on each of the spindles 4 is a slotted bushing 17, said bushing being connected to the spindles by means of a spline or key 20 fitting into a slot in each of the spindles. The bushing 17 may slide upon the spindle 4, but rotates therewith owing to the spline or key 20 connected to the spindle and bushing. A tapering slot 19 is formed in the bushing 17 and extends from end to end thereof to receive the tapering key 20 having an enlarged portion 21, which engages the slot 19 in the bushing 17.

A collar 22 is fitted to slide on the spindle 4 and engages the bushing 17 to move said bushing 17 in the direction of the collar 23 when the spindle 4 is swung upon its pivot to cause the bushing 17 to retract and allow a wheel to turn freely thereon, the collar 22 being caused to slide on the spindle 4 by pins 26, which will be hereinafter more fully described.

A spiral spring 24 encircles the outer end of the spindle 4 and bears against the collar 23 at one end, while the opposite end bears against the spindle nut 25. Sliding pins 26 are mounted in the spindle knuckle members and extend longitudinally of the spindle, said pins bearing at one end against the collar 22 and their opposite ends bearing against lugs 27, formed on the axle knuckle and projecting in line with the pins 26.

From the foregoing it will be obvious that when the spindle members are turned sharply in one direction or the other the pins 26 will be pushed outwardly by means of the lugs 27, said pins impinging upon the collar 22 to push it outwardly, carrying with it the sleeve 17, and compressing the spring 24.

My invention is simple in construction, is efficient in operation, cannot readily get out of order, and is economical in that it saves the wear and tear on tires, particularly in making short turns.

What is claimed is:—

In a device of the class described comprising spindles, universal means for connecting the spindles to the ends of an axle, knuckle members carried by the spindles and the ends of the axle, means for pivotally securing the ends of the knuckle members together, said spindles provided with slots, bushings provided with tapering slots surrounding said spindles, keys slidably mounted within the slots of said spindles, an enlarged tapering portion formed on said keys and extending into the tapering slots of said bushings, collars secured to said spindles for an engagement with one end of said bushings, springs adjustably secured to the spindles for an engagement with said collars, collars slidable on said spindles, pins carried by the knuckle members upon the spindles for an engagement with said second mentioned collars, and the other ends of said pins engaging the knuckle members carried by the axle to move the bushings in the direction of first mentioned collars to retract said bushings upon said spindles.

In testimony whereof I affix my signature in presence of two witnesses.

MAURICE A. PALMER.

Witnesses:
WAYNE VAN SCHOYCK,
PAUL MAYER.